United States Patent [19]
Labrador

[11] Patent Number: 5,435,259
[45] Date of Patent: Jul. 25, 1995

[54] REIN-DEER KITE AND ITS CONTROL SYSTEMS

[76] Inventor: Gaudencio A. Labrador, 1312 Leaf Ter., San Diego, Calif. 92114

[21] Appl. No.: 97,655

[22] Filed: Jul. 27, 1993

Related U.S. Application Data

[63] Continuation-in-part of Ser. No. 255,657, Oct. 13, 1988, Pat. No. 5,056,447, and Ser. No. 773,680, Oct. 8, 1991, abandoned.

[51] Int. Cl.6 .............................................. B63B 35/00
[52] U.S. Cl. ..................................... 114/39.2; 114/102
[58] Field of Search ................ 114/39.1, 61, 102, 103; 212/71; 416/8

[56] References Cited

U.S. PATENT DOCUMENTS

| | | | |
|---|---|---|---|
| 3,326,392 | 6/1967 | Rock | 212/71 |
| 3,933,110 | 1/1976 | Jamieson | 114/61 |
| 3,937,166 | 2/1976 | Lindsay | 114/61 |
| 4,116,151 | 9/1978 | Guthrie | 114/39.1 |
| 4,124,182 | 11/1978 | Loeb | 416/8 |
| 4,708,078 | 11/1987 | Legaignout et al. | 114/102 |
| 4,756,666 | 7/1988 | Labrador | 416/8 |

*Primary Examiner*—Stephen P. Avila

[57] ABSTRACT

What has been created is a new device that is used to take benefits from the energy of the high altitude winds for purposes of doing work and to produce usable and storable energy such as electricity, compressed air, etc., without using fuel. This device maybe in the form of an ordinary glider kite serving as an airborne sail or as an airborne tractor that pulls a vehicle on land or on water as a traveling anchor, the kite may carry an airborne passenger who may steer said kite left or right so that the anchor may travel oblique against the wind. The vehicle, acting as a moving anchor, is provided with an anti-overturning control system of various kinds and types such as a control rope that is looped around the middle section of the vehicles, or a straight bar that is extended sufficiently beyond both sides of the vehicle thru the ends of which said control rope is looped around, or said bar being in the form of a rail tract to push the bottom end of the kite's anchor rope far out from the lee sides of the vehicle to prevent overturning. The kite may be provided with lifter cylindrical balloons on its top to be able to carry loads at low speed winds. Said cylindrical balloons may also be provided with oppositely rotating wind turbines wherein said cylindrical balloon rotates on its axis in multilevel array for electric power, or to serve as a Sky Bike.

4 Claims, 9 Drawing Sheets

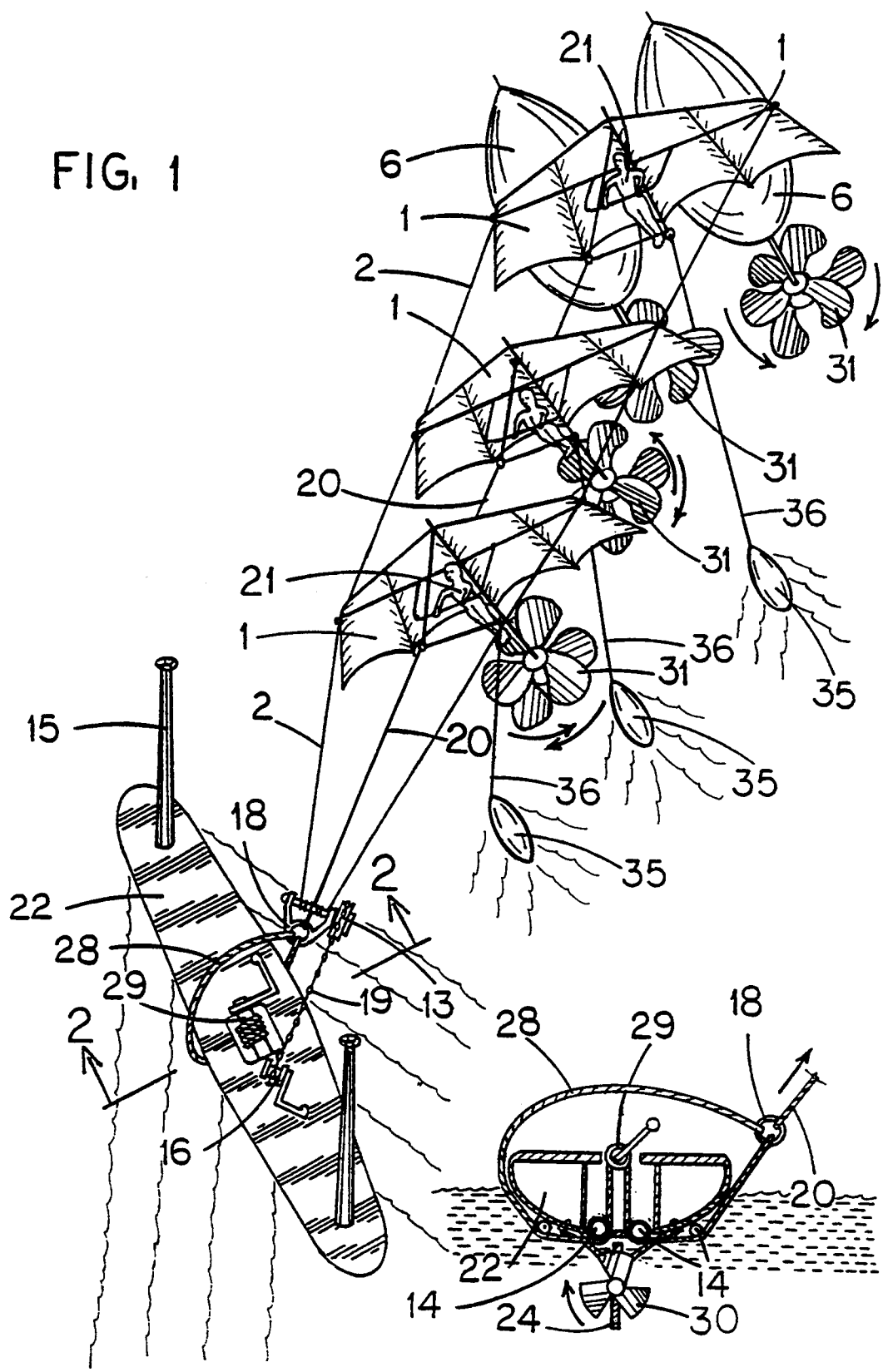

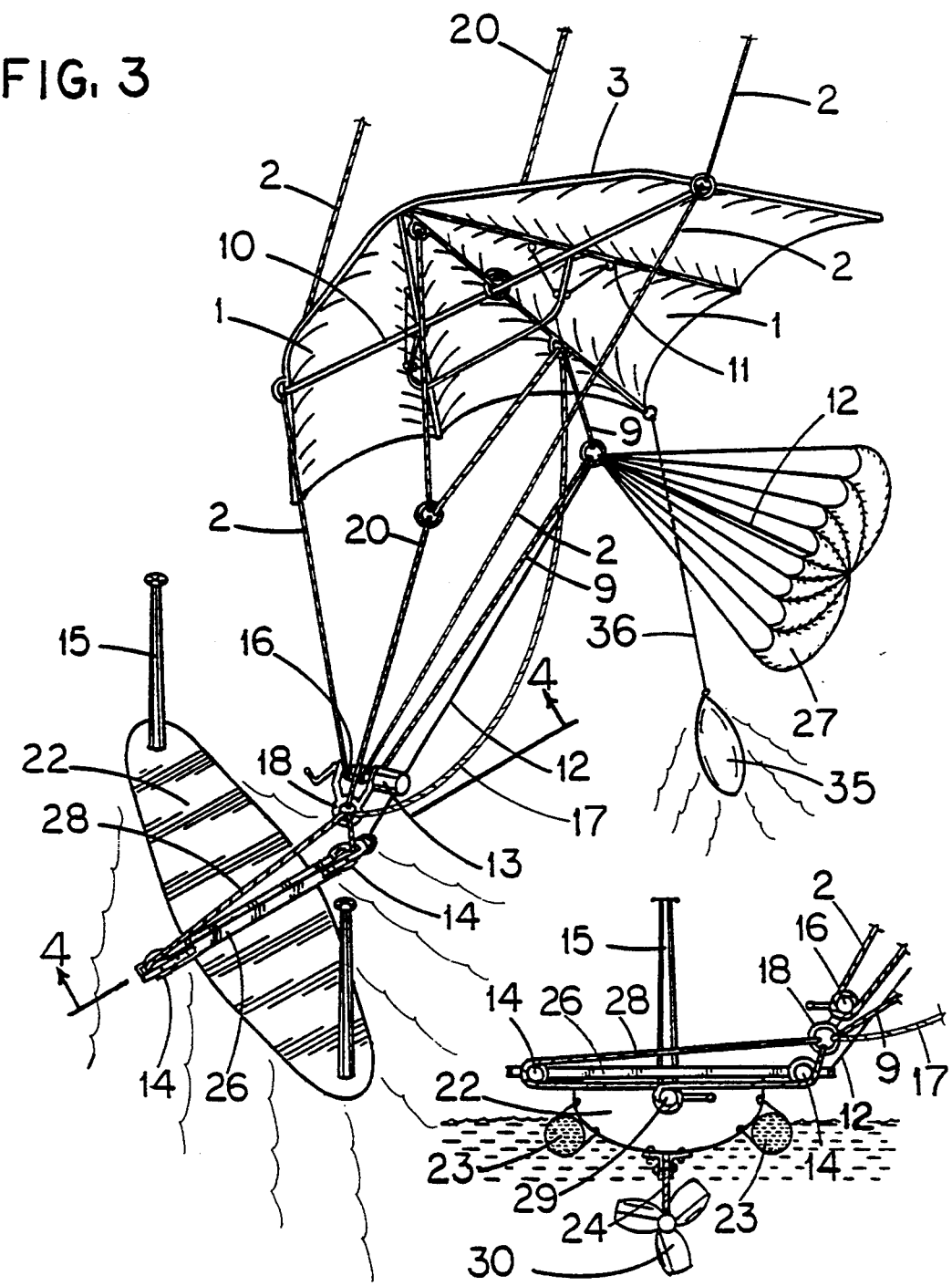

REIN-DEER KITE AND ITS CONTROL SYSTEMS

This is a continuation-in-Part of U.S. application Ser. No. 07/255,657 dated Oct. 13, 1988 with U.S. Pat. No. 5,056,447 issued Oct. 15, 1991; and also a continuation-in-part of U.S. application Ser. No. 07/773,680 filed Oct. 8, 1991 now abandoned.

There is no government assistance in this invention, hence, the inventor's right is full.

BACKGROUND OF THE INVENTION

1. Field of Invention

This invention deals with the free energy of the wind at high altitudes to make said energy become available at ground level. In trying to attain this objective, several new inventions and new hardwares had been developed to meet the requirements of the high altitude winds. Several sub-objectives had evolved that lead to the inventions of new kind of structures that are made to be lighter than air to make it float up in the slay, new types of frames to build large kites at a minimum structural members new methods of making the kite deflect a maximum cross-section of the wind, new application and development of wind resistors, new windmills that are lighter than air, and new anti-overturning control system for vehicles being pulled by the Rein-Deer Kite, to maintain a few.

2. The Prior Arts

The prior application Ser. No. 07/255,657 has presented a lighter than air device, an air-borne transportation and an air-borne, tractor without using fuel, and its various methods of control systems, but its construction methods and structures are just very expensive. This new invention now presents a much simplified structure in operation and in cost.

SUMMARY OF THE INVENTION

This new series of the Labrador Rein-Deer kite is created to cut down cost of construction and to maximize the effectiveness of said kite in deflecting the wind at any position in order to maximize its pulling effect upon its traveling anchor. This presentation hereby adopts all the objectives and all the solutions presented under the previous patent application Ser. No. 07/255,657 filed Oct. 13, 1988, which has been approved with U.S. Pat. No. 5,056,447 to be issued on Oct. 15, 1991.

On top of the already invented device under the above identified previous application, the following new devices have been created, and being applied for Patent Rights, to wit:

1. A new half-octagonal peripheral front and side frame of a kite which may be a simple pipe or in the form of a cylindrical large pipe that is filled up with light gas to make it lighter than air and be able to float up in the sky. Several pieces of said half-octagonal balloon pipes of different radius maybe disposed concentrically side-by-side to each other to form a flat face frame on the periphery of the kite, as illustrated by part No. 3 of FIG. 3;
2. A new way of constructing a balloon kite wherein the kite is a simple framed sheet and the lifter balloons that are attached to the top of said kite are made to be elongated cylindrical and deflatable balloons to reduce wind resistance, as illustrated by part No. 6 in FIG. 1;
3. A new way of constructing a multi-level oppositely rotating wind turbine which is in the form of large flat wide-face balloons for the impellers, wherein one or more of such wind turbine assembly are attached to the tail of each kite that are assembled in a multi-level vertical array; as illustrated by part No. 31;
4. A new method of making the kite to deflect more wind, by pulling down its tail but not allowed to rise upward on its angle of flight, thru the use of wind resistors, such at wind turbines that maybe put on and off or open and closed. Said wind resistors may also be in the form of a parachute that is provided with control string to remotely close or to open it, or in the form of a spherical balloon that is provided with supply air hose to remotely inflate or deflate it as needed, as illustrated by Part 27;
5. A new method of constructing a glider kite which is a simple framed fabric but the frames are extended longer to the rear to make a broad and wide-faced kite particularly at the tail, approaching a square face, so that when the tail is pulled down and the nose is tilted up—there will be a large face of the kite deflecting a larger cross-sectional area of the wind;
6. A new method of traveling in group by air wherein each kite member in the multilevel vertical array carry its own passenger, be it a balloon kite or a framed plain sheet;
7. A new method of steering the kite which is accomplished by a winch that inversely shorten the left wing control rope while it elongates the right wing control rope;
8. A new method of anchor connector that guards against overturning of the vehicle that is used as a traveling anchor, wherein a control rope is looped around across the middle, section of the vehicle thru a control winch that forcibly moves the kite's anchor rope far beyond to the lee side of the vehicle, and wherein a plurality of deep-groove rollers are disposed at the bottom of the vehicle to hold said rope and to remove friction of said rope upon the bottom and side surfaces of the vehicle, as illustrated by FIG. 2;
9. A new method of an anchor connector that guards against the overturning of the vehicle that is used as a traveling anchor wherein a long control bar is horizontally and transversely disposed on the middle top of said vehicle such that its ends extend beyond the side of said vehicle, wherein both ends of said bar are provide with deep-groove rollers thru which a control rope is looped around, wherein a control winch is disposed at the bottom of said bar thru which said control rope is looped around in order to forcibly drive the bottom end of the kite's anchor rope beyond the boat's lee side;
10. A new method of increasing the stability of the boat—by attaching, on both sides of the vehicle just below the water line, a calibrated ballast weight of any appropriate kind and shape but preferably in the form of a pipe that is filled up with water and air containers such that said ballast weight pipe floats at least 5% above the water when set loose alone, in order not to lose said ballast weight into the deep waters, and in order to prevent the boat from being lifted up out of the water by the kites. Due to the presence of said ballast weight there is a great stability of the boat against overturning such that there will be no need for the said control winch installed below said control bar, hence said winch may be dispensed with.

11. A new method of converting the energy of the high altitude winds by attaching to the middle bottom of the boat—a water turbine which is driven by the water running under the boat as being pulled by the Rein-Deer kites, said water turbine must be either below the middle section of the boat or one water turbine at each end of the boat since said boat may sail back and forth without turning around; as illustrated by part No. 30 in FIG. 2 and FIG. 4;

12. A new method of preventing the kite from rising up to a high angle of flight elevation in the form of a moving weight of any form that floats and slippery on water upon which the kite is tied to but being towed by kite, to have more face area of the kite against the wind, see part No. 35;

13. A new method of a kite-sail in the form of a framed rectangular plain:sheet, concave or convex, that is controlled by two reversible telescopic horizontal bars and by floating moving weights tied to the kite, wherein two auxiliary masts are being laid down transverse to the boat to control the kite when sailing along the wind current, as shown in FIG. 5;

14. A new method of a high altitude multilevel windmill wherein a cylindrical balloon is provided with wind impellers or windmill blades disposed oblique to the longitudinal axis of said cylindrical balloon, said blades being in the form of flat balloons or ordinary framed helix sheets or plain sheets framed by small cylindrical balloons, the main body is rotatory;

15. A new method of constructing a wing, see part No. 48 of FIG. 6, to tilt up the front end of a rotating cylindrical balloon-windmill—said wing being in the form of cylindrical balloons attached to each other side-by-side to form a horizontally flat balloon;

16. A new method of constructing a windmill impeller blade that is in the form of framed sheets but the outer ends are in the form of pointed cylindrical balloons disposed oblique to the wind, in order to lift the impellers afloat up in the air or to eliminate its weight at the same time to act as additional impellers for the windmill, see part No. 45 in FIG. 6;

17. A new method of constructing a windmill blade which is in the form of wide sheet sails that are supported by at least four masts that are disposed radially perpendicular to the axis of said cylindrical lifter balloons;

18. A lighter than air structural frame that may be used to support airborne bodies or objects, which is made bulletproof by using Kevlar fibers or spectra fibers or other strong fibers as outer skin and to make it able to withstand highly pressurized light gas .content, which is in the form of a cylindrical balloon that is strong against bending and compression, a plurality of which may be arranged to form a strong framework that is floating up in the sky, as illustrated by part No. 50 in FIG. 6;

19. A new method of constructing a Sky-Bike which is in the form of a rotating pointed cylindrical balloon that is provided with circumferencial helical impellers at its middle section or at its rear section with a lifter type rudder, the passenger capsule and its bike mechanism being suspended from the main body of said balloon bike by means of the driving belt, see FIG. 7.

20. A newly invented safe balloon wherein said balloon is made bulletproof by wrapping it with a strong skin that is made up of kevlar fibers and spectra fibers in a composite construction, said balloon being made to have larger volume so that the ratio of the "weight of skin/weight of air displaced less the weight of helium content" remains less than One.

21. A new invention for a wind turbine blade wherein a lifter pointed elongated balloon is attached to the outer periphery of a sail-type blade, in order to make said turbine blade be lighter than air, said lifter balloon being allowed to revolve around the turbine.

22. A new invention for a wind turbine wherein a set of a clockwise rotating turbine is assembled together co-axially with a set of counter-clockwise rotating turbine to prevent the kite or the lifter elongated balloon from being rotated, and to double the relative speed of an oppositely rotating armature against a rotating cylindrical magnet to double the output of an electric generator that is being driven by said turbine. This kind of turbine is referred to as an oppositely rotating turbine, and said generator is referred to as an oppositely rotating electric generator.

23. A new invention for an oppositely rotating turbine-type air compressor or water pump, wherein, a series of oppositely rotating turbines are alternately interphased together in a multilayer fashion to relatively double the speed of said turbine.

24. A new invention for an oppositely rotating gas turbine or jet turbine, wherein, a series of oppositely rotating sets of turbines are alternately interphase with each other in a multilayer fashion in order to maximized convertion of the expanding gas into mechanical energy.

25. A new invention for an oppositely rotating electric generator wherein, a plurality of concentric cylindrical magnets are alternately interphased co-axially with a plurality of concentric cylindrical wire coils armature that rotate oppositely against the rotation of said magnets.

26. A new invention for an oppositely rotating water turbine wherein, wherein, a plurality of floater cylinder or pipe are submerged under running water and provided with a series sets of turbine blades along the length of each pipe and laid parallel to each other current-wise, said turbines are made to oppositely rotate alternately against each other and mechanically connected by drive belts .to drive an oppositely rotating electric generator, an oppositely rotating turbine type compressor, and an oppositely rotating turbine type water pump.

27. A new invention for an oppositely rotating water turbine, wherein, a plurality of turbine are attached in a series along the length of a long drive shaft which is suspended from and carried by an elongated floater that floats on the water,in order to submerge said turbine under running water, said carrier floater being anchored against the water current. A plurality of this apparatus are laid parallel to each other current-wise, and said drive shafts are made to oppositely rotate alternately against each other, and each pair of opposite turbines are made to drive a series of oppositely rotating electric generator/compressor mounted above the water.

28. A new invention for an oppositely rotating electric, generator, wherein, a plurality of a disc-type wire coil armatures are attached spacedly in a series to a central drive shaft and being spun/rotated co-axially by said drive shaft, and wherein, a plurality disc-type magnets are attached in a series inside a cylindrical drive shaft at a spacing that matches the spacing of said wire coil discs with appropriate clearance between the wire discs and the magnet discs, and said magnet discs are alternately placed in-between said wire coil discs and being oppositely spun/rotated against the said wire coil discs co-axially. Said cylindrical drive shaft having a diameter large enough to accommodate the diameter of said wire coil discs and said magnet discs with appropriate clearance, in order to function as an electric generator.

29. A new invention for a safe wind sail that is used as blade for an oppositely rotating turbine, wherein, the upper side of a wide face sail is fixly attached to an upper bar frame while the bottom side of said sail being adjustabley attached to a lower bar frame by means of a plurality of control ropes that elongate during high speed winds but retract during low speed winds. In order to deflect more of the low speed winds and deflect less of the high speed winds automatically self adjusting in order to be able to work safely in all weather conditions to take advantage of the time of abundance. Said control ropes are being wound around a winch that is contralled by a calibrated coil spring or any appropriate device that rotates said winch and resistively unwind said control rope, the left and right sides of said sail being set free. Said sail is also being alternatively attached to a radial mast of a turbine wherein the front side is fixed at one mast while the rear side of said sail being also adjustably attached to the succeeding radial mast by means of said coil spring controlled winch thru which said control ropes are wound, see FIG. 10 and FIG. 6, part #52, 2, & 13.

30. A new invention for a safe wind sail that is used as blade for an oppositely rotating wind turbine, wherein, a wide face sail is eccentrically attached to a radial mast that is elastic enough to act as torsion bar, and wherein, the upper and lower sides of said sail are attached to bar frames that are locked perpendicularly to said radial mast in such firmness to be able to twist said mast during strong winds so that the sail will become almost neutral to the violent wind, hence, the turbine will have the opportunity to harvest energy from the violent winds working at ease, see FIG. 11 part 31 and 53.

31. A new invention for an oppositely rotating co-axial turbines, wherein, a plurality of planetary gears are spacedly inserted in-between the oppositely rotating cylindrical drive shafts. The smaller cylinder is provided with outside drive gear and the larger cylinder is provided with inside drive gear upon which said planetary gear fits in and being driven. Said planetary gear drives the armature of an electric generator, see FIG. 11, part 70, 71, 75 & 51.

32. A new invention for a kite-sail that floats on water wherein, three wide face sails are attached to a central bar connector to form a radial sail with cylindrical or elongated floaters attached to each outer side of said sail so that the two sails serve as legs that stand stridingly on the water while the third sail stands upright for the wind. This sail is alternatively in the form of inflatable plastic construction or a simple framed sheet with radial frames and plastic pipe floaters. This sail is allowed to roll over the water like a paddy wheel when moving along the the wind current. The central bar connector is tied to a sling control rope in order to make this floating sail to act as a kite that do not fly but moves obliguely against the wind when pulling a boat that sail obliquely against the wind. A thin wall is also being provided under said floaters to serve as rudder under water and to prevent said floating sail from drifting sideward when acting as an independently flaoting sail boat without being controlled by another boat, See FIG. 12.

BRIEF DESCRIPTION OF THE DRAWINGS

FIG. 1 illustrates how a multilevel vertical array of of kites, having a half octagonal peripheral frame, a plurality of lifter balloons and various control systems, such as oppositely rotating wide face turbines, moving anchor; moving control weight anti-Overturning bar connectors, and steering winch, functions as an airborne transportation.

FIG. 2 illustrates how a traveling anchor is provided with a control-connector device in the form of deep grooved pulleys and winch to hold the anchor rope of the kite, to prevent overturn of said traveling anchor, and an oppositely rotating water turbine.

FIG. 3 illustrates how a framed fabric kite is made wide and broad, being provided with a parachute-type wind resistor and being steered by winch.

FIG. 4 illustrates how a control connector transverse bar is attached to the moving anchor vehicle, and a water, turbine being provided under the boat to convert the energy of the running water into what ever storable and usable energy desired.

BEST MODE FOR CARRYING OUT THE INVENTION

Figure 5:
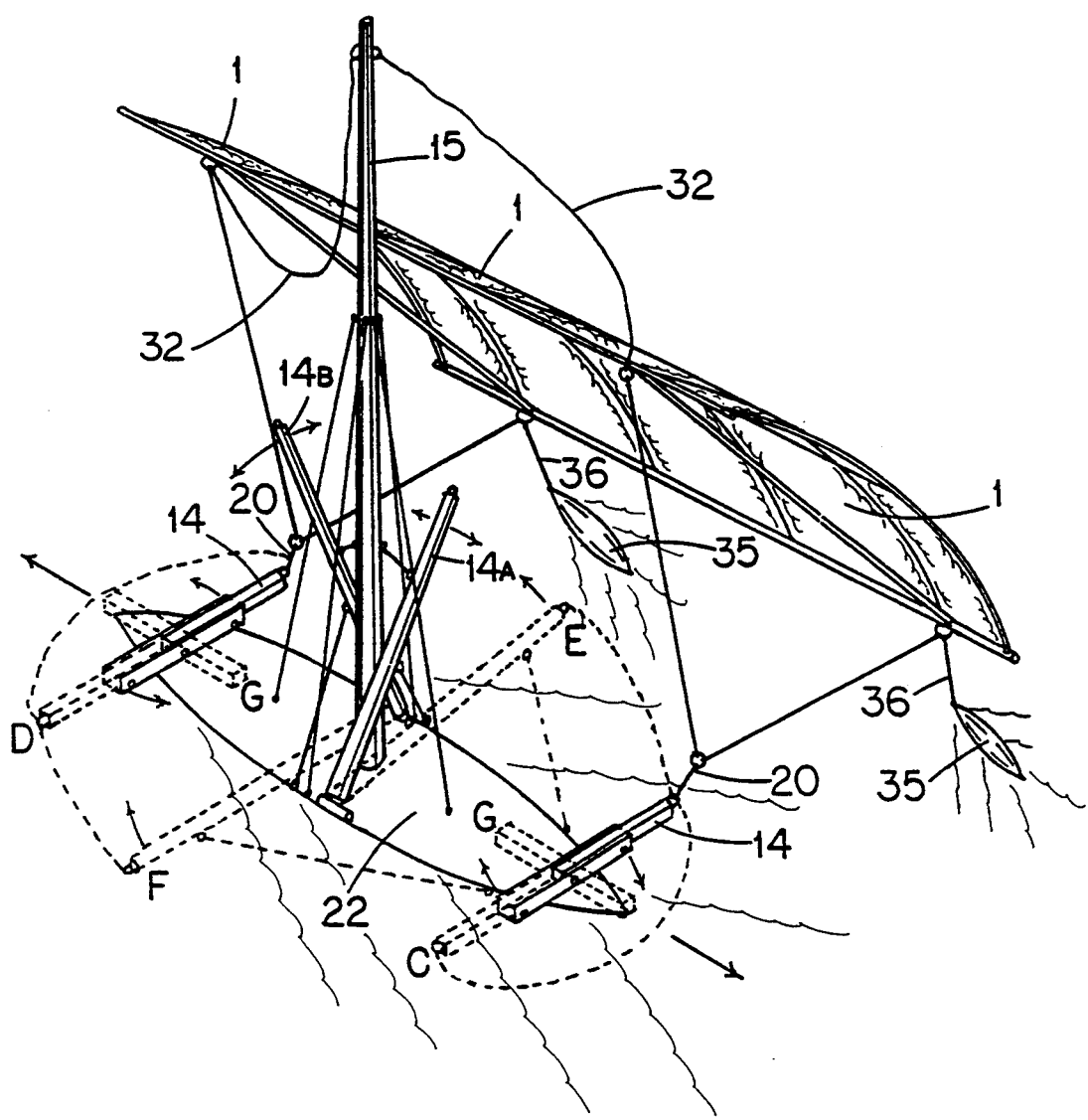
FIG. 5 illustrates how an ordinary framed sheet oversized sail is made to act as a kite having moving control weights that float and slide on water, and the new designs of telescopic and adjustable anti-overturning control bars that connect said sail-kite to the boat.

Accordingly and pursuant to the objectives of this invention, as enumerated in the summary, the following new designs and embodiments have been created to provide the most appropriate technology to meet the needs and to open a new frontier and to lead mankind to a new horizon of scientific adventure, which can be more understood by further reading the descriptions of the figures, to wit:

FIG. 1 illustrates a new embodiment of a multilevel vertical array of kites 1, acting as sail, which are not allowed to rise up to a higher angle of flight elevation in order to maximize impedance or wind deflection by the kite-sail 1 that should exert maximum pull upon the boat 22 out of every square foot face area of said kite-sail 1. This objective is attained by the creation of a ballast weight 35 that is pointed and made slippery on water, which may be in the form of a cylindrical tank that is filled up with water and air and calibrated to float on water by at least 5%, said ballast weight being attached to the sling knot of the anchor rope 20 thru a tug rope 36, said ballast weight 35 being heavy enough so that it cannot be lifted out of the water by the kite-sail, said ballast weight 35 may-also take the form of a cart on wheels rolling on land or on a rail track or a sled sliding on ice.

FIG. 1 illustrates the embodiment of a plurality of a multi-level vertical array of ordinary framed fabric glider kites 1 tied together one above the other by the anchor rope 20, when the wind is strong enough to fly the kite 1, each kite 1 being maneuvered or being steered manually by its own passenger 21 thru a vertical "U"-Bar, for purposes of traveling in group by air at a desired directions oblique against the wind, using a plurality of glider kites. The bottom end of anchor rope 20 is secured to anchor ring connector 18 that holds the two ends of the control rope 28 that is looped around and under the traveling anchor vehicle 22, as being pulled by the kites, which may be either a water vehicle or a land vehicle that is steered remotely by the kite's passenger. Said Ring connector 18 may be provided with power winch 13 that holds the anchor rope 20 to release upward or bring down the kite by the kite's passenger thru remote control. The control rope 28 is also looped around the control winch 29 which may be operated either manually or operated by electric power remotely by the passengers 21 that are riding up at the kite 1 in order to forcibly move the anchor rope 20 of the kite 1 far beyond the lee side of the boat 22 such that the anchor rope 20 will be pulling the boat 22 below its center of gravity in order to safe guard it against overturning. The masts 15 are erected at the front and rear ends of the boat 22 in order to avoid entanglement of the anchor ropes 20 upon the masts 15. The kite's passengers 21 may tilt their respective kites 1 to the left or to the right all at the same time to make the boat travel back and forth oblique against the wind without turning around.

FIG. 1 also illustrates an embodiment when the wind is strong enough to fly the kite wherein the passenger 21 are down riding on the vehicle 22 not on the kite 1, and that the multi-level glider kites 1 are just being used as an airborne tractor or wind sail to pull the boat 22, and wherein after releasing the kites upward by anchor rope 20 thru winch 13, the anchor rope 20 is removed from winch 13 and is transferred to the anchor ring connector 18 while the left and right wing steering ropes 2 are wound around said winch 13 in order to effect steering process upon the kites either manually or electrically, Boat 22 then becomes a sailboat that uses the kites 1 as airborne sail, without the assistance of the balloon 5 for a better speed, traveling oblique against the wind back and forth without turning around, as both ends of the boat 22 is provided a rudder which maybe operated manually or by remote control. The wind turbine 31 is in the form of a wide face flat balloon that floats in air, and maybe attached to the tail of the kite 1 to served as wind resistor at the same time to serve as windmill to produce electric power for the batteries on the boat 22. In trying to make the kite 1 to face a larger cross-section of the wind in order to make it more powerful in serving as an airborne tractor, the tail of the kite 1 is pulled down ward by the rear "y" part of anchor rope 20 and its nose tilted upward, but in doing so, the kite 1 will soar upward approaching the zenith making the face of the kite 1 less exposed to the wind's cross-section again and the pulling power of the kite 1 is again reduce, hence the wind resistor 31 is created and attached to the tail of the kite to bring down the angle of flight elevation of the kite 1. The impellers of the windmills 31 may be manipulated to become neutral by radio control on and off, to increase the angle of oblique travel of the boat against the wind.

FIG. 1 also illustrate an embodiment when the wind is slow and not strong enough to fly the kite 1 that has load or passenger 21, wherein, the first or top kite 1 is provided with a plurality of lifter elongated cylindrical balloons 6, for easy start out, and all the lower succeeding kites 1 are not assisted by balloons 6 but are all lifted by the first top kite 1. The succeeding lower kites may also be provided with there own lifter balloon 6, if desired specially when the wind is too slow which also serve as wind resistor to bring down the angle of flight elevation of the kite 1. The balloons 6 may be deflated to increase the sailing speed against the wind across the ocean as the wind becomes strong. The deflating and inflating process for the balloons 6 while on flight is done by providing an air hose from the boat 22 up to the balloon 6, where the boat 22 serves as light gas storage. Light gas such as the Hydrogen Gas is produced on board the boat 22 while traveling by the electrolysis of water powered by the windmills 31 up in the kites 1 and by the water turbines 30 down under the boat 22.

FIG. 1 also illustrates an embodiment of an opportunity to harvest large quantities of energy from the high altitude winds by flying a multi-level vertical array of large sizes of flat balloon wind turbines 31 at the tail of each kite 1, wherein, each kite 1 is also a flat balloon to carry loads, or each kite 1 being provided with lifter elongated cylindrical balloons 6 the tail of which holds a large balloon wind turbine 31. This apparatus is anchored stationary. Wherein the kites 1 are being steered against the rotation of the windmills 31 thru steering wind rope 2 and winch 13.

FIG. 1 also illustrates an embodiment of an opportunity to harvest large quantities of energy from the high altitude winds by flying a multi-level vertical array of large sizes of flat balloon wind turbines 31 that are attached to the tail of a plurality of elongated cylindrical lifter balloons 6 that are tied/assembled together to form a vertical array of balloons 6, without the kite 1, but in lieu thereof, a helical or spiral fin, in oppose to the rotation of the wind turbine 31, is provided along the length and on each quadrant of the cylindrical elongated lifter balloon 6. This apparatus is anchored stationary for the production of electricity or compressed air.

FIG. 1 also illustrates an embodiment wherein the kite 1 maybe steered by a load 21, in the absence of a passenger hanging from the center of the kite 1 and acting electro-mechanically upon the "U" steering bar by remote/radio control, instead of steering the kite 1 by using the wing rope 2.

FIG. 2 illustrates section 2—2 of FIG. 1 showing the embodiment of a control system that prevent overturning of the vehicle being pulled by an airborne tractor wherein, the anchor rope 20, coming down from the kite 1, pulls the traveling anchor vehicle 22, thru a line of action passing far outside the lee side of the boat 22, such that the resulting force passes below the center of gravity of the boat 22. This procedure is effected by the control rope 28 that loops around and under the vehicle 22 but wound around a control winch 29, both ends of control rope 28 being held by the anchor ring connector 18 which also holds the bottom end of the kite's anchor rope 20. The deep-grooved rollers 14 are provided at the bottom and sides of boat 22 to remove friction between the control rope 28 and the boat 22. The control winch 29 is operated, manually or by electricity, to forcibly move the anchor ring connector 18 far out beyond the lee side of the vehicle 22. Thereby safeguarding the vehicle 22 from overturning. Due to the creation of this anti-overturning control system, the vehicle 22 has now the freedom to have as much large airborne sails as desired. Part 24 is a thin blade long wall disposed under the boat 22 to act as resistor against sideward drifting due to the pull of the kite 1, at the same time to act as ballast weight to prevent the boat 22 from being lifted out of the water by the airborne tractor 1.

FIG. 2 also illustrates an embodiment wherein a water turbine 30 is attached under the boat 22 to effect the convertion of the wind energy into mechanical energy. As the boat 22 is being pulled by the kite 1, the water will be relatively running under the boat 22 and bumping against the blades of the water turbine 30.

FIG. 3 illustrates an embodiment showing how to build a low cost but large, wide, and broad ordinary framed fabric kite 1, wherein, the fabric is extended further to the rear by making the frames 11 longer towards the rear, There is shown also a new design for a peripheral front and side frame 3 that is formed into a half octagon where the ends extends way back to the rear of the kite 1 to make the kite 1 able to deflect a large cross-section of the wind. The wind force is proportional to the broadness of the kite's face. There is also control rope 9, that is looped to a pulley at the tail of the kite 1 and continued to drop down to the anchor ring connector 18, which maybe used to pull down the tail of the kite 1 at the same time to bring up the wind resistor 27 to the tail of the kite, in order to make more face of the kite 1 be exposed to the wind. The wind resistor 27 is a parachute that can be made closed and opened as needed by the control string 12.

FIG. 3 also illustrates an embodiment of an opportunity to make the kite 1 become lighter than air by making the frames 3, 10, and 11 in the form of a cylindrical pipe balloons and by making the spread sheets in the form of an envelope that is filled up with light gas, several pieces of the half-octagonal frame 3 in the form of cylindrical balloons may be put together side-by-side concentrically along the plane of the kite 1 to form a wide face flat frame. Winch 16 is electrically powered by Electric motor 13 being provided so that the kite 1 may be maneuvered remotely. The anchor rope 20 and the wing rope 2 are being extended upward to take hold of the next higher elevation kites 1.

FIG. 3 also illustrates an embodiment of a newly created control system, comprising of a straight control bar 26 that is attached horizontally and transversely on middle top of the traveling anchor vehicle 22. Said control bar 26 being long enough to extend its end far beyond the sides of the vehicle 22. A deep-grooved roller 14 to hold the rope 28 is disposed at both ends of said control bar 26, The control bar 26 should be made long enough such that the anchor rope 20 from the kite 1 pulls the boat 22 allways far out beyond the lee side of the boat 22 to safeguard against overturning of the boat 22. It should be noted at this point that the vehicle 22 cannot turn around against the wind, but instead, it must always be turned around along the wind current as the kite is always pulling the boat 22 to the lee side very vigorously. As the boat 22 turns around clockwise towards, under, and to the left of the kite, the anchor ring connector 18 will be traveling along and over the control bar 26 from the right towards the left end of the bar 26, as the left side of the boat 22 will become the lee side.

FIG. 4 is a detailed cross-section 4—4 of FIG. 3 illustrating the side view embodiment of the said newly created control bar system. There is shown a winch 29, either manual or electrically powered, is disposed to drive the control rope 28 beneath said control bar 26. The control rope 28 is looped around the deep-grooved rollers 14 at both ends of the control bar 26 and also operatably wound around the winch 29. The two ends of the control rope 28 are securely attached to the anchor rope 20 together with the steering rope 2 from the kite 1 thru the anchor ring connector 18. The purpose of this control bar system is to be able to push out the anchor ring 18 far beyond the lee side of the boat such that the resulting line of action of the kite's anchor rope 20 will be passing below the center of gravity of the vehicle 22 in relation with the side ward resistance of the water acting horizontally upon the lee side of the boat 22 and the side ward resistance force of the water acting upon the sides of the thin wall blade 2 below the boat. The ballast weight 23 is a calibrated weight in the form of a large pipe of length at least 50% of of the boat's length, and is attached along each side of the boat 22 just below the water line to prevent the boat 22 from tilting to the left or to the right. The ballast weight 23 is calibrated by filling it up with a mixture of water and water tight air containers so that it will float at least 5% or be 95% submerged when set loose on the water so that it will not get lost into the deep ocean. When the boat 22 tilts down to the right, the weight 23 on the left will come out of the water and the buoyancy of water acting upward upon it is removed and therefore, its full weight immediately acts downward forcing the boat 22 to level back on the water. With this powerful stability of the boat 22, the winch 29 maybe dispensed with, and the anchor ring connector 18 will just be moving easily back and forth across the boat 22 along the control bar 26 as the control rope 28 will just be running easily and turning around the deep-grooved rollers 14 as the kite 1 pulls the anchor ring connector 18 across the boat 22 towards the lee side without the assistance of the winch 29. The water turbine 30 is disposed under the boat 22 to convert the energy of the water running under the boat 22 due to the pull of the kite. The ballast weight 23 also prevents the baot from being lifted out of the water by the kite-sail.

Figure 7:
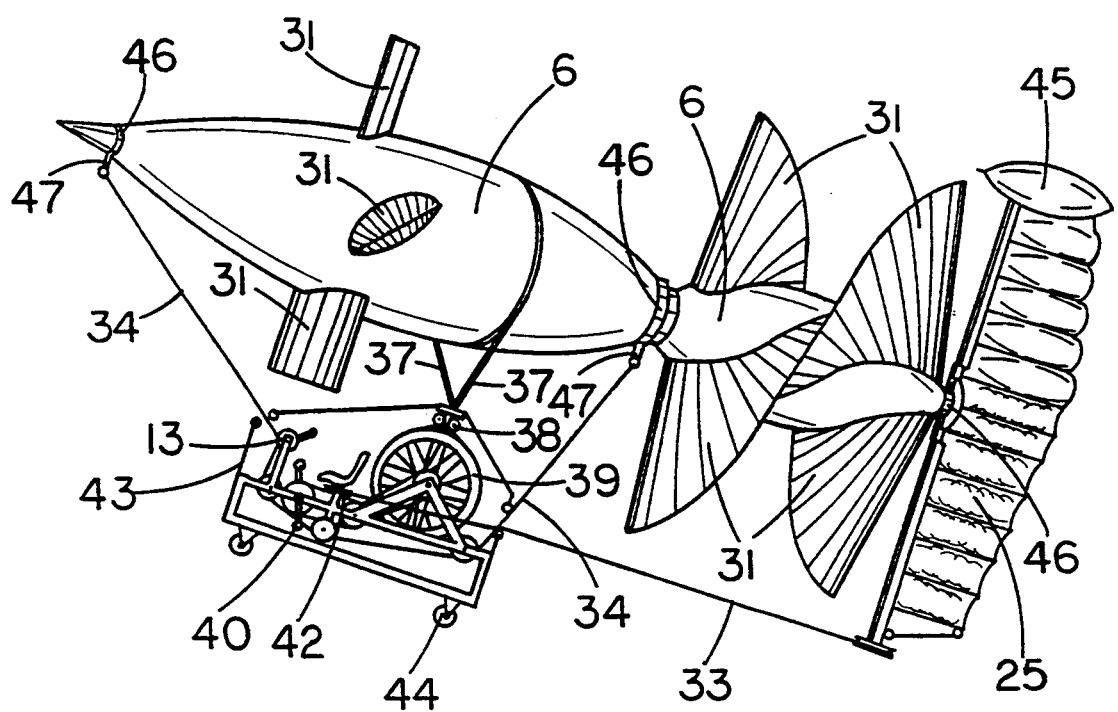
FIG. 7 illustrates how to construct a new design for for a sky-bike by means of a lifter cylindrical balloon having spiral/helical impeller fins and being rotated by the passenger thru bike pedal, and a balloon-type rudder to steer said sky bike.
Figure 8:
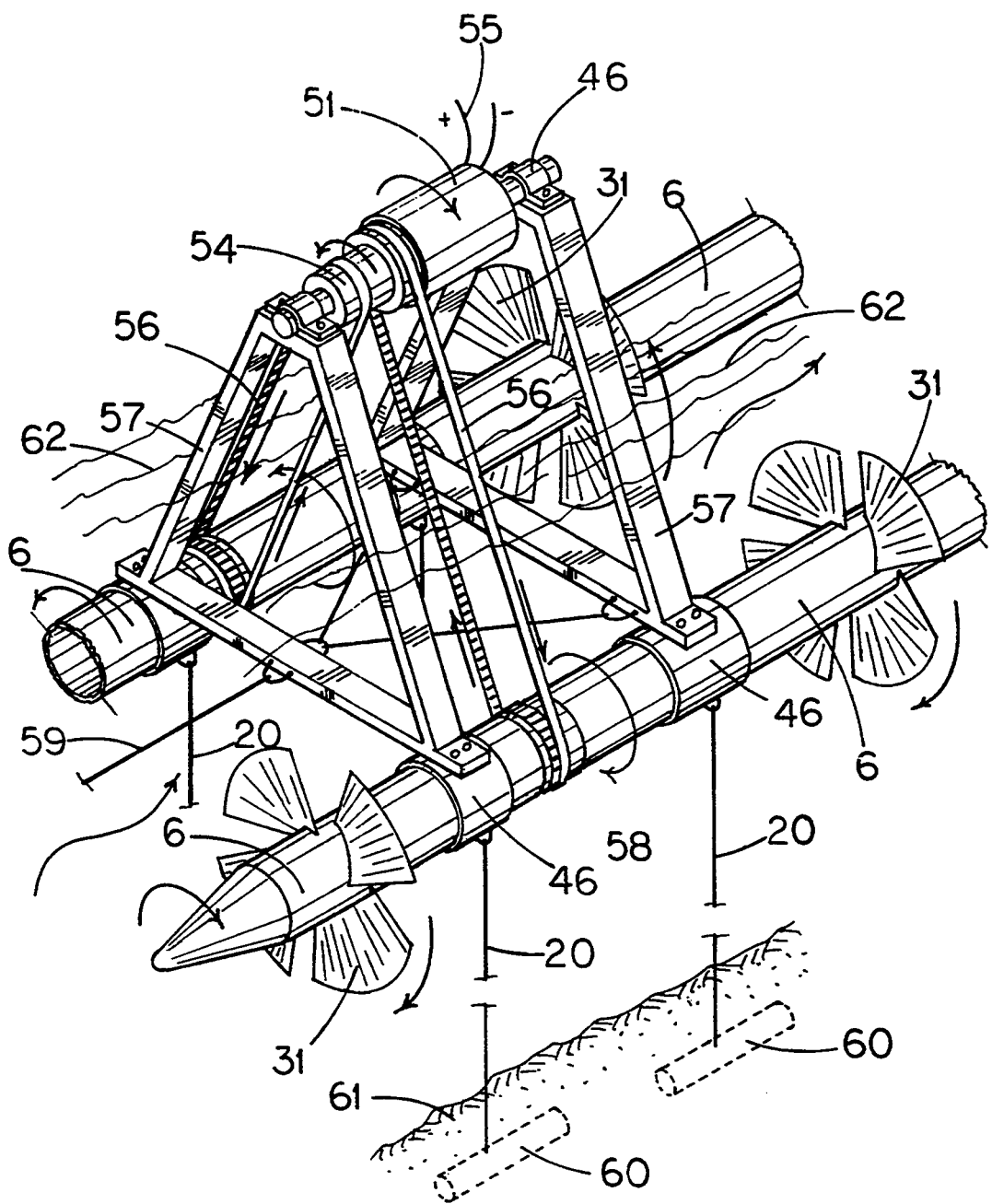
FIG. 8 illustrates how a lifter elongated floater that is provided with a series of several turbines along its length is anchored underwater current and do the same with several other floaters laid parallel with the first floater and rotating opposite to each other to produce electricity thru an oppositely rotating magnet against wire coil armature.

FIG. 3 and FIG. 4 also illustrate an embodiment of an opportunity for constructing an anti-overturn control device/system, wherein, the transverse control Bar 26 is just in the form of a rail tract, similar to the part No. 28 together with part No. 30 of FIG. 7 as well as that of FIG. 8 of the previous application Ser. No. 07/255/657, under U.S. Pat. No. 5,056, 447, but in this presentation, said rail tract is now a straight rail tract control bar No. 26 which is provided with a rigid flange on its top upon which a hook- roller assembly is attached but set free to roll all along the length of said rail tract. The anchor ring connector 18 is securely attached to the top of said hook-roller assembly and the pull force of the kite 1 is then guided to move along control bar 26, thereby preventing the boat from overturning. Said rail tract control Bar 26 may also be in the form of a hallow box bar having an opening lengthwise on top thru which a bar connector passes and the Hook-roller runs inside the box bar 26.

FIG. 1. FIG. 3 and FIG. 5—also illustrates a newly created powerful control system for the Kite-Sail 1, wherein, a pointed cylindrical ballast weight 35 that floats on water by at least 5%, which may be of any form but preferably in the form of a plastic pipe partially filled with water, or in the form of a weight having wheels rolling on land, or a Hook roller that is attached to any kind of railway, such as a bar or cable railway, or said ballast weight being in the form of things sliding on ice, or in the form of persons skiing on ice or on water or on roller skates, or in the form of floating things to which a hook line is attached for purposes of catching fish, or said ballast weight being in the form of boats that are loaded with passengers in which case the kite-sail is being shared among several boats sailing together using a common sail in a share-a-sail-teamwork game wherein at least two boats having on-off water resistors are being pulled by the kite while the other boats likewise having on-off water resistors serve as ballast weight tied to the bottom of the kite 1, said ballast weight 35, in all the aforesaid configurations functions to hold down the kite-sail to a fixed distance above the water preventing said kite from rising up to a higher angle of flight elevation in order to tilt up the kite thereby exposing more face of the kite to obstruct a wider cross-sectional area of the wind in order to deflect a greater air mass per second thereby making the kite exert a stronger force upon the boat being pulled. The hight of the kite above the water may be made variable by adjusting the length of the tie rope 36.

FIG. 5 illustrates an embodiment of an opportunity, wherein, in order to cut down costs, a rectangular framed fabric/sheet kite without inflated parts is used as a sail that is made to be unusually broad and wide that is beyond the holding power of the boat if said sail 1 were to be supported by thru the mast 15 of the boat 22. But since the kite 1 pulls the baot thru an anti-overturning bar connector 14 that is telescopic, the boat can easily take hold the supper large sail 1 without tilting. When the boat is not sailing or is preparing to sail, the kite-sail 1 is held up to the mast by suspension rope 32 while the anchor rope 20 together with restraining rope 36 are released to make the kite 1 neutral to the wind to remove wind pressure upon the kite 1, at the same time, the boat is pointed along the direction of the wind current in order to remove the danger of overturning the boat 22. In the process of starting out to sail, the anchor ropes 20 of the kite 1 are then tied down to the outer ends of the left and the right auxiliary masts 14-A and 14-B that would be laid down to the positions E and F respectively while the suspension ropes 32 are released to remove force upon the mast 15. The restraining ropes 36 are then tightened to pull down the bottom of kite 1 to the ballast weight 35 in order to fully blow up the kite 1 in front of the boat 22 to make a maximum obstruction of the kite-sail 1 against the wind. As the boat turns to the left to sail transverse to the wind, the left anchor rope 20 is transferred from the point F to the right end of the front horizontal control bar 14, while the right anchor rope 20 is transferred from the point E to the right end of the rear horizontal control bar 14 in order to make the kite 1 fly along the right side of the boat 1. The auxiliary mast 14-A and 14-B will then be hoisted to the erect posture with the main mast 15. The boat mast turn around along the wind current to place the kite 1 to the left side of the boat, in which case, the front control bar 14 mast be elongated to point D while the rear control bar mast be elongated to point upon which the anchor rope 20 to the kite mast be tied to. When the control bar 14 is not in use, it may be turned along the axis of the boat to the position G. The boat is also provided with anti-side drifting device in the form of a thin blade vertical wall along its bottom keel to make the boat speed up oblique to the pull force or, the kite-sail.

Figure 6:
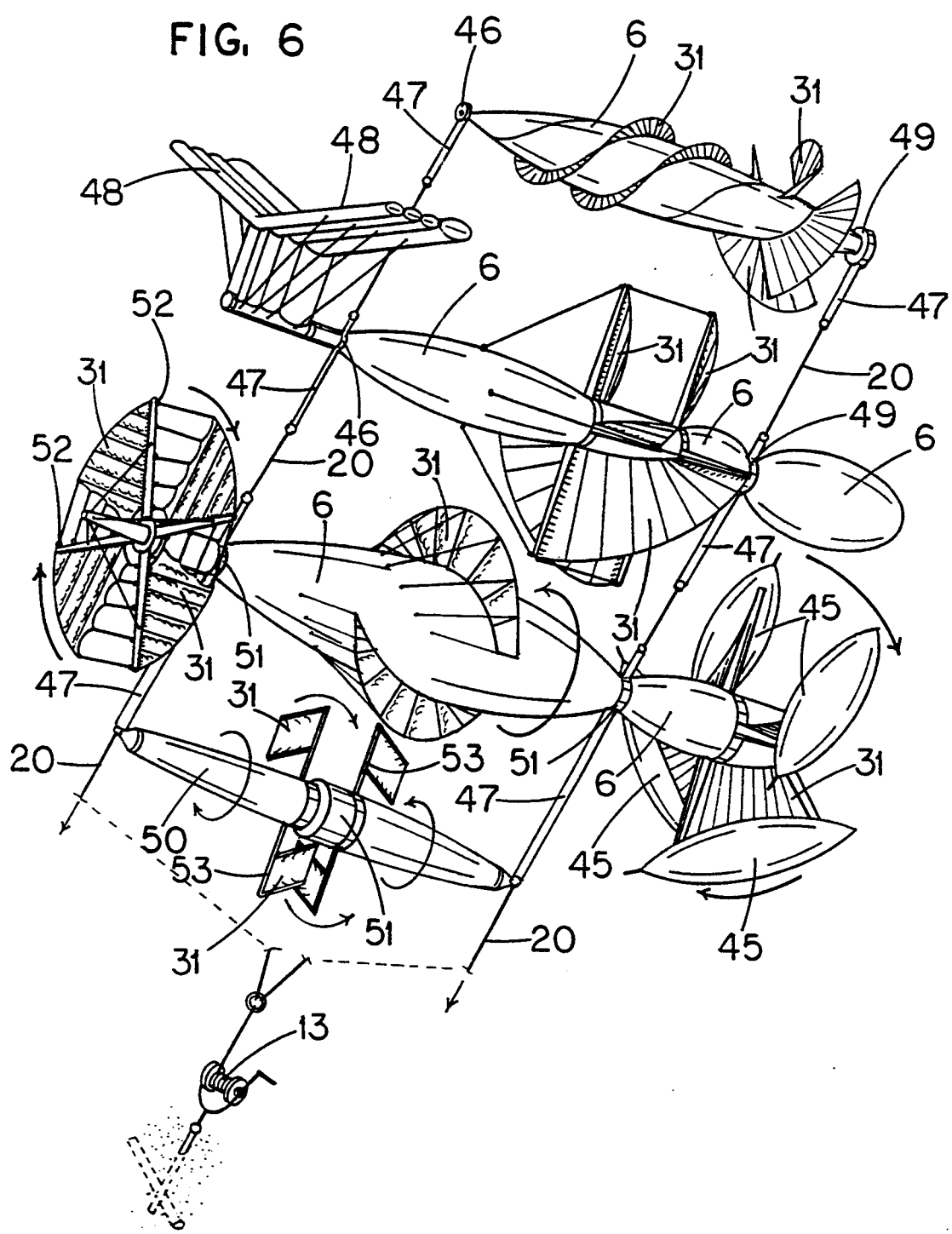
FIG. 6 illustrates how to convert the energy of the higher altitude wind by means of multilevel lifter cylindrical or elongated balloons, oppositely rotating wide face sail turbines, balloon-type turbines, a self-adjusting sail to be safe against high speed winds, a torsion bar mast that adjust the sail against the strong winds, and an oppositely rotating armature against the rotating magnet of an electric generator.

FIG. 6 illustrates an embodiment of a new opportunity to harvest energy from the high altitude winds by means of a high flying multilevel windmill in the form of a vertical array of pointed elongated cylindrical balloons 6 that are provided with windmill blades 31 in various forms, such as, a helix of framed sheets wound around to form a screw around the body of said cylindrical balloon, a plurality of inflated thin balloon long windmill blades set up around the body of said cylindrical lifter balloons, a plurality of framed wide sheets 31 disposed oblique around said cylinderical balloons held outward by means of front and rear radially disposed masts that are held firmly by guy ropes, a plurality of smaller pointed cylindrical balloons 45 disposed obliquely at the outer ends of said framed wide sheets 31 the purpose of which is to build a self lifting impeller, and a plurality of windmill blades in the form of wide sails 31 disposed obliquely and held outward by at least four radially disposed in one plane masts to which the front side of the sail 31 is attached while the rear side of the sail is held away from the succeeding mast by means of strings or ropes. The pivoted bearing-arm 47 holds the coil of the electric generator 49 at the front and rear of the of the cylindrical balloon windmill which turns the magnets of the generator 49. The anchor ropes 20 hold the vertical array of the flying multilevel windmill to the ground and made adjustable by the winch 13. The balloon wing 48,that is made up cylindrical balloons that are held together side-by-side to form a flat wide face kite that has a vertical wall as stabilizer,—is provided to react with the wind in order to lift the front end of the cylindrical balloon windmill at the next lower level. The wing 48 does not go with the rotation of the windmill but stay upright by means of a bearing connected to the tip of the cylindrical windmill 6. The strut 50, which is in the form a high pressure cylindrical balloon, is provided to push out and keep alignment of the anchor rope 20 and the bearing arm 47. The said balloon strut 50, which is provided with a high strength skin such as kevlar fibers to enable it to contain high pressure light gas,—is a new invention as a new kind of structural member that is used to construct rigid structures of various sizes and shapes that may float up in, the sky for industrial purposes, as it is lighter than air. Part 46 is the front pivoted bearing without generator.

FIG. 6—also illustrates a new design for a lighter than air wind turbine blades wherein a pointed elongated lifter in balloon 45 is attached to the outer periphery of said turbine blade 31 pointed towards the direction of revolution.

FIG. 6—also illustrate an embodiment to make said sail-type turbine blade 31 be safe against violent weather by making said sail able to relax against the strong wind thru the used of automatically elongating control rope wound around a winch that is controlled by a calibrated coil spring, see part 52.

FIG. 6—also illustrates the embodiment of an oppositely rotating wind turbine 6, wherein, the front section turbine rotates clockwise, the middle section turbine rotates counterclockwise, and the rear section turbine rotates clockwise, and next succeeding turbine rotates counter-clockwise, and so on in a long series of turbines in the same elongated lifter balloon 6, and wherein, a newly designed electric generator 51 is installed in-between and driven by said oppositely rotating turbines, said new designed generator 51 having its magnets in the form of an outer cylinder rotating clockwise and its wire coil armature likewise in the form of an inner cylinder rotating counter-clockwise.

FIG. 6—also illustrates an embodiment of an oppositely rotating turbine that drives an oppositely rotating electric generator 51, said turbine being in the form of a sail 31 that is eccentrically mounted/attached to the outer section of a highly elastic torsion bar 53 to make said sail able to be relax against the violent wind and make said turbine still able to work safely during violent weather to take advantage during the time of abundance of energy, said turbine and generator being carried by a high pressure balloon strut structure 50.

FIG. 6 also illustrates an embodiment of a new type of windmill up in the sky,wherein, an ordinary plain large kite, not inflated, may suspend up a rotary sail windmill 31, as shown below the wing 48, in which case, the front anchor rope 20 of the large kite is attached to the front end of the axle of the suspended rotary sail windmill while the rear anchor rope 20 of the large kite is attached to the rear end of the axle of said sail windmill. This type of non-inflated flying windmill may be better off than the inflated windmill because gun shots can easily destroy the balloons.

FIG. 6 also illustrates a new invention of a bullet proof inflated balloon, wherein, as aforemention in the construction of the high pressure cylindrical balloon strut 50, the outer skin of the lifter balloons is made up of thick laminated layers of KEVLAR Fibers, or SPECTRA Fibers that prevents the bullet from getting thru the balloon. The balloon is made larger to make it able to carry the weight of its outer skin KEVLAR Fibers. It should be noted at this point that the "skin weight/helium gas weight" Ratio may be maintain or reduced by enlarging the balloon to fly.

FIG. 6 also illustrate a new embodiment of a flying windmill, wherein, said rotary sail windmill is carried up in the sky in between two large plane kites all together in one line of axis along the wind current, or said rotary sail windmill is carried in between two cylindrical balloon kites that are provided with wide and broad wings, said wings being necessary to be broad and wide to lift the windmill to a higher angle of flight elevation because said rotary sail windmill offers a high resistance against the wind that tends to move the kites down to the ground.

FIG. 7 illustrates a new embodiment of a new Sky-Bike which enables a person to fly around the sky by purely man-power, wherein, a Bike mechanism 39, 40 is suspended below the cylindrical lifter balloon 6 by means of a drive belt 37 that is that is wound around the bike's drive wheel 39 and around and over the cylindrical lifter balloon 6 thru a deep friction groove around said balloon. A pivoted bearing arm connector 46 is disposed at the front and rear end of said balloon 6 to serve as a steady connector that holds the connector arm 47 for the elevator rope 34 that is used to maneuver the balloon 6 to point up or to point downward by cranking the winch 13 thereby moving the weight of the bike mechanism 38-44 foreward or rearward—in order to tilt the balloon 6 upward or downward. A plurality of inflated narrow radially disposed impellers 31 are provided at the mid-section of the lifter cylindrical balloon 6—as a first option for an impeller type. The second alternative way is a semi-helix inflated framed wide sail-type impeller 31 disposed at the tail of the lifter cylindrical balloon 6 and attached to an additional lifter cylindrical balloon 6. The frame of said wide helix impeller may be in the form of a plurality of straight sticks that radially push out the outer edge of said wide helix impeller 31. The rudder 25 is disposed at the rear of said helix impeller 31 and attached thereto by another pivoted bearing 46, and being manipulated thru string 33 by the operator sitting on top of the winch 42. The upper part of said rudder 25 is made up of a plurality of superposed cylindrical small balloons plus an additional pointed lifter cylindrical balloon 45 at the top to make said rudder 25 stay upright. Said rudder 25 is needed to steer the Sky Bike left or right. The two-directional roller bearing 38 forces the drive belt 37 get together at one point to enable the drive wheel 39 stay at right angle with the rotation of the lifter balloon 6, so that the drive pedal 40 will be in line with the drive wheel 39. The casing 43 may be a transparent plastic film to serve as a capsule for the passenger. The whole passenger capsule is provided with frame with bottom wheels 44 for a landing gear. Said drive wheel 39 may also be disposed to rotate parallel to the rotation of the cylindrical lifter balloon 6, in which case, said drive wheel 39 is disposed at right angle with the drive pedal 40. It should be noted that for a slow moving impeller it should have a wide and broad face approaching that of a square, because the wind pressure upon a sail approaches zero as the width of the sail approaches zero, hence, the wide sail impeller.

The aforementioned Sky Bike may be in the form of another embodiment, such that the sail-type impeller may be directly attached to the rear end of the passenger capsule and driven by a drive shaft that is mechanically connected to the pedal, while the the passenger capsule being suspended from the lifter cylindrical balloon thru a pivoted bearing arm connector at a constriction at the midpoint of said lifter balloon.

It should be noted also that the high pressure cylindrical balloon structural strut part #50 as shown in FIG. 6, having Kevlar and/or Spectra woven fibers for its high strength skin, is a new invention of a bulletproof balloon or Super Light Structure for use to make new inventions of a bulletproof airborne/high-altitude viewing and observation station or a house or as a restaurant or a jumping out station for gliders/parachuters, —said airborne station may have adjustable control wings to maneuver it thru the wind up and down or left and right.

FIG. 1—also illustrates an embodiment for an oppositely rotating wind turbine 31 to drive an oppositely rotating magnet and wire coil armature of an electric generator, said assembly being attached to the tail of a lifter elongated balloon or to the tail of a kite or underwater under a boat, to generate electric power supply to said kite.

FIG. 8—illustrates an embodiment of an oppositely rotating turbine 3I that turns an elongated lifter cylinder 6 that is anchored floating underwater in a running water 62. A pair of said elongated floaters 6 are made to turn opposite to each other in order to turn an oppositely rotating wire coil armature 54 that turns counter-clockwise against a cylindrical magnet 51 that turns clockwise to double the speed of said electric generator which may also be an air compressor or a water pump. Said driven machines/device 54 being desposed above the water and mechanically connected to said turbines 6 by means of drive belts 56. A plurality of sets of said turbine blades 31 are being attached at even spacing along the length of said floater cylinder 6 in order to make a long series of turbines along the water current to make up a big power output. A plurality of said floater cylinder 6 turbines are being disposed parallel to each other across the water current to cover up the whole channel of running water 62. The same procedure is being done with the elongated lifter cylindrical balloon 6 wherein a series of several turbines 31 are attached at even spacing along the length said long cylindrical balloon 6 in order to make a powerfull series of turbines floating up in the air.

Figure 9:
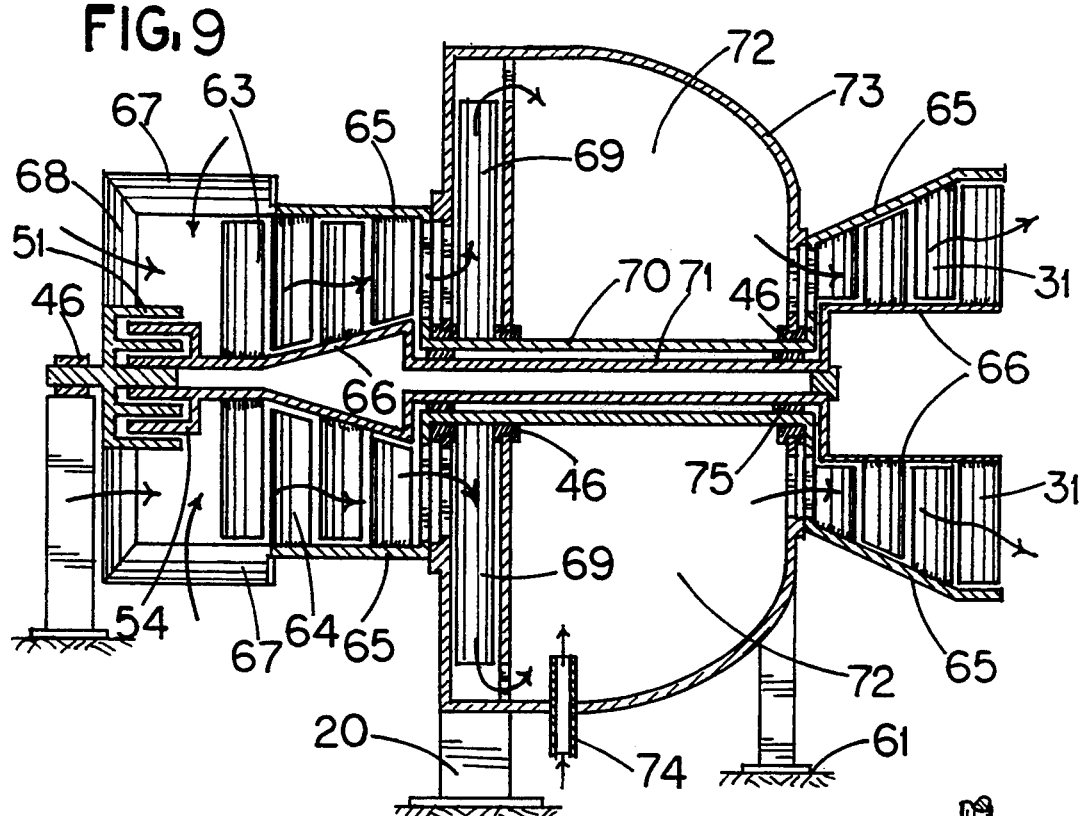
FIG. 9 illustrates how to construct a new design for an oppositely rotating gas/jet turbine, oppositely rotating pipe drive shaft, oppositely rotating turbine-type air compressor, an oppositely rotating interphased multilayer concentric cylindrical maganets against a multilayer concentric cylindrical wire coils, and a pre-compressor air scooping vanes.

FIG. 9—illustrates a new invention of an oppositely rotating gas turbine engine or jet engine that drives an oppositely rotating turbine type compressor and also drives an oppositely rotating multi-layer concentric-cylinders electric generator 51/54 by means of an oppositely rotating concentric pipe drive shafts 70/71 wherein, the turbine blade 31 that revolves clockwise are held together by an outer cylinder 65 that rotates clockwise, while the turbine blades 31 that revolves counter-clockwise are being held by an inner cylinders 66 that rotates counter-clockwise. The power of said outer cylinder 65 is transmitted to the outer pipe drive shaft 70 that drives the outer cylinder 65 of the front air compressor. The power output of said inner cylinder 66 of the gas turbine is transmitted thru the inner pipe drive shaft 71 that drives the inner cylinder 66 of the front air compressor. Said outer cylinder 65 at the front air compressor holds and revolves clockwise the compressor vanes 64, the pre-compressor scoop vanes/blades 67 & 68 and also rotate clockwise the multi-layer concentric cylindrical magnets 51 of the front electric generator. Said inner cylinder 66 holds and revolves counter-clockwise the compressor vanes 63 and also rotates counter-clockwise the multi-layer concentric cylindrical wire coil armature 54 of said electric generator. Part 69 is the impeller blade of a centrifugal type compressor that serves as the final high pressure stage of the compression process which is being driven by the outer pipe drive shaft 70. Part 46 is a roller bearing to hold the drive shafts and the drive cylinders in place. Part 20 is a vertical and lateral support of the engine. Part 73 is a high temperature enclosure shell for the combustion chamber 72 and which also encloses the final centrifugal compression stage 69. Part 74 is an inlet for fuel, steam, volcanic or geothermal steam, and compressed air going into the combustion chamber 72. Part 61 is a solid support for the engine. Part 75 is a planetary gear that separates and cynchronizes in-between said inner 71 and outer 70 pipe drive shafts.

Figure 10:
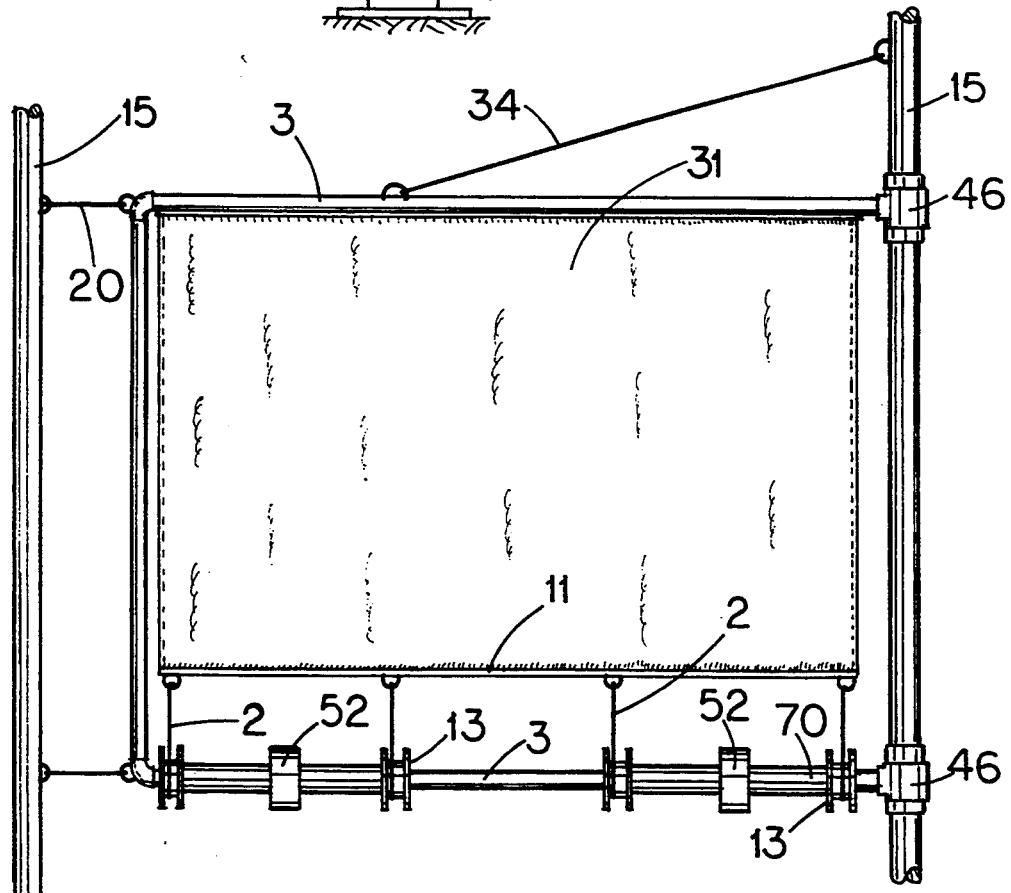
FIG. 10 illustrates how to construct a new design for a self/automatic adjusting wind sail that is safe against high speed winds by means of a winch that is controlled by a calibrated coil spring or other elastic devices, said safe sail being used for wind turbines.

FIG. 10—illustrates a embodiment of a new invention for a control system that enables a wind sail to work safely during violent weather, wherein, a highly elastic material or a coil spring 52 is set to control a winch 13 thru pipe drive shaft 70. Said coil spring is locked on the sail frame part #3 and resistively unwinds when the control rope 2 forcibly turns winch 13 to elongate:rope 2 as the sail 31 is blown out harder by the speeding wind. The mast 15 stays perpendicular to the wind and the frame 3 stays oblique to the wind as fixed by control rope 20. Bearing 46 allows frame 3 and sail 31 to flip left and right. The guy rope 34 fixes frame 3 to stay perpendicular to the mast 15. Bar 11 distributes the force of rope 2 evenly to the lower edge of sail sheet 31. As the wind blows harder, the sail sheet 3 is allowed to fly further away from winch 13 by elongating control rope 2 and fly higher towards the upper frame 3 giving way for the rushing wind thereby the wind force upon the sail remains constant which does not overload the wind turbine as a whole, hence, allowing the wind turbine to be working safely at ease even during violent weather to take advantage of the time of abundance. This sail 3, 31 and mast 15 is being attached and serves as a radial blade for a rotary wind turbine, and also being attached to a car on a railway track in a long series in a closed loope to build a supper large windmill, and also being attached to multi-level aerial cable railway on a closed loop that drives an end-loope gear to build a supper large aerial windmill, see U.S. Pat. No. 4,859,146 dated Aug. 22, 1989.

Figure 11:
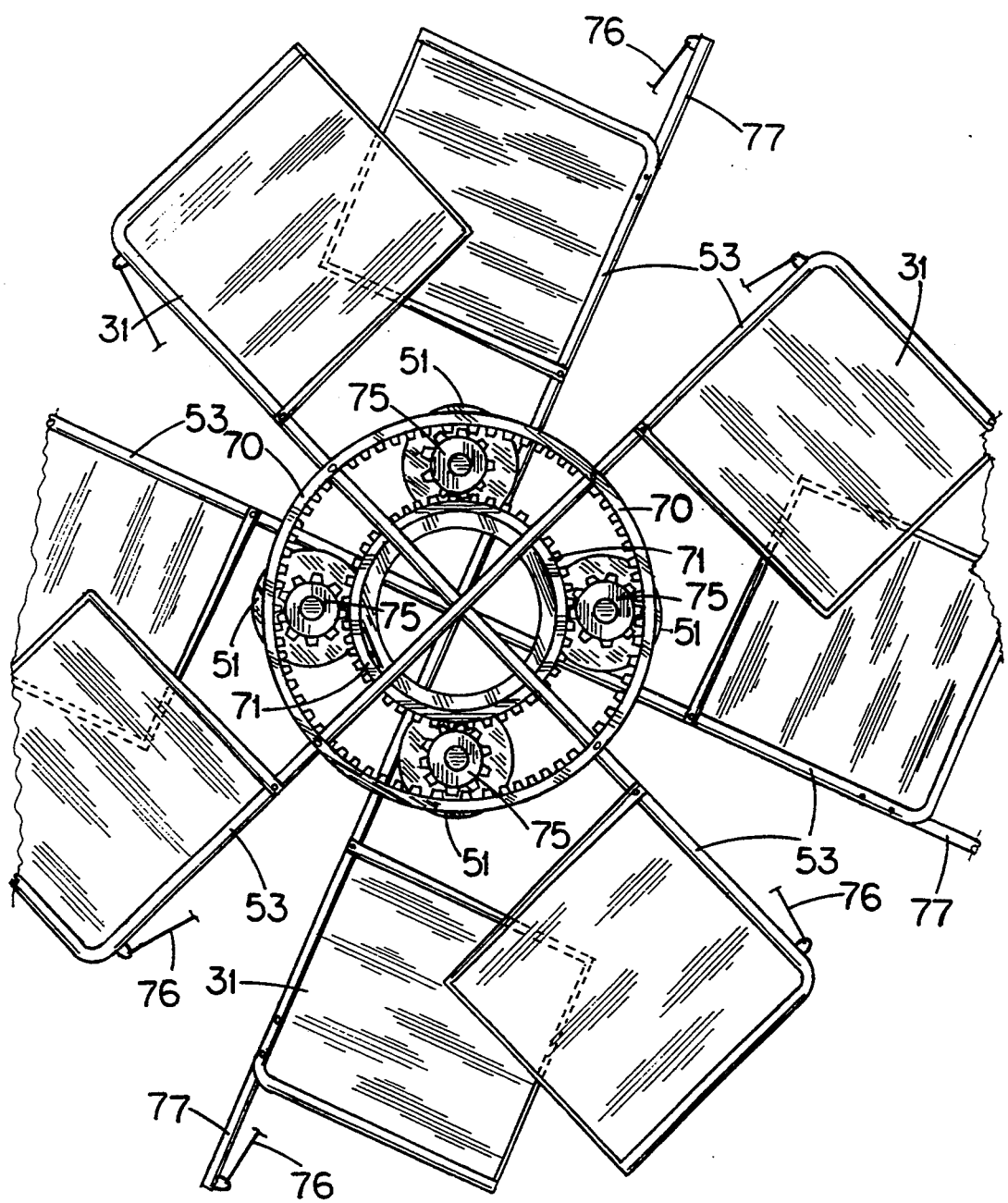
FIG. 11 illustrates how to construct a new design for a plurality of electric generators being driven by oppositely rotating wind turbines thru self adjusting torsion bar masts and thru planetary gears in-between oppositely rotating concentric cylindrical gears.

FIG. 11—illustrates an embodiment of a newly invented oppositely rotating wind turbine wherein the sail 31 is eccentrically attached to the mast 53 so that when the wind pushes said sail 31 backward, said sail 31 is forced to become oblique to the wind by forcibly twisting the mast 53 that acts as a torsion bar, it being highly elastic and calibrated to match the size of the sail 31. As the strong wind blows harder, the sail 31 becomes more oblique to the wind by twisting the torsion bar mast 53 further, thereby, the sail 31 becomes less resistant to the violent wind, hence, the wind turbine becomes relaxed and works safely during strong winds as the torsion bar-mast 53 is twisted far enough such that the sail 31 becomes almost neutral to the wind. The mast 53 is being held against the push of the wind by means of a guy wire 76 that is tied to a forward axial bar. Said oppositely rotating turbines 53 correspondingly drive an oppositely rotating concentric drive shaft cylinders, the inner cylinder 71 having an outside drive gear rotates counter-clockwise as driven by the front turbine 53 and being extended forward to hold the front turbine 53, while the outside cylinder 70 having an inside drive gear rotates clockwise as driven by the rear turbine 53 and being extended rearward to hold the rear turbine 53. A plurality of planetary gear 75 is being inserted in-between inner gear 71 and outer gear 70 and being driven by said inner and outer drive shaft cylinders gears 71 & 70 simultaneously. Each of said planetary gears drives an electric generator 51 thru an automatic multiplying transmission gear. During low speed winds, only one electric generator is being loaded, and during high winds all the said generators 51 are being loaded and additionally the magnetic fields are being increase during high winds inc. order to harvest more energy from the strong winds. An additional gear is also being provided such that the magnetic cylinder of said electric generator is being drive by said planetary gear in opposite rotation against the wire coil armature. An extension bar 77 at the outer end of said mast 53 at the rear turbine is also being provided to hold the guy wire 76 for the rear turbine 53 so that the rear guy wire will not interfere with the rotation of the front turbine. It should be noted herein that the wide face sail 31 should approach the form of a square in order to deflect more wind. As the wide of the sail approaches zero, wind deflection becomes zero.

Figure 12:
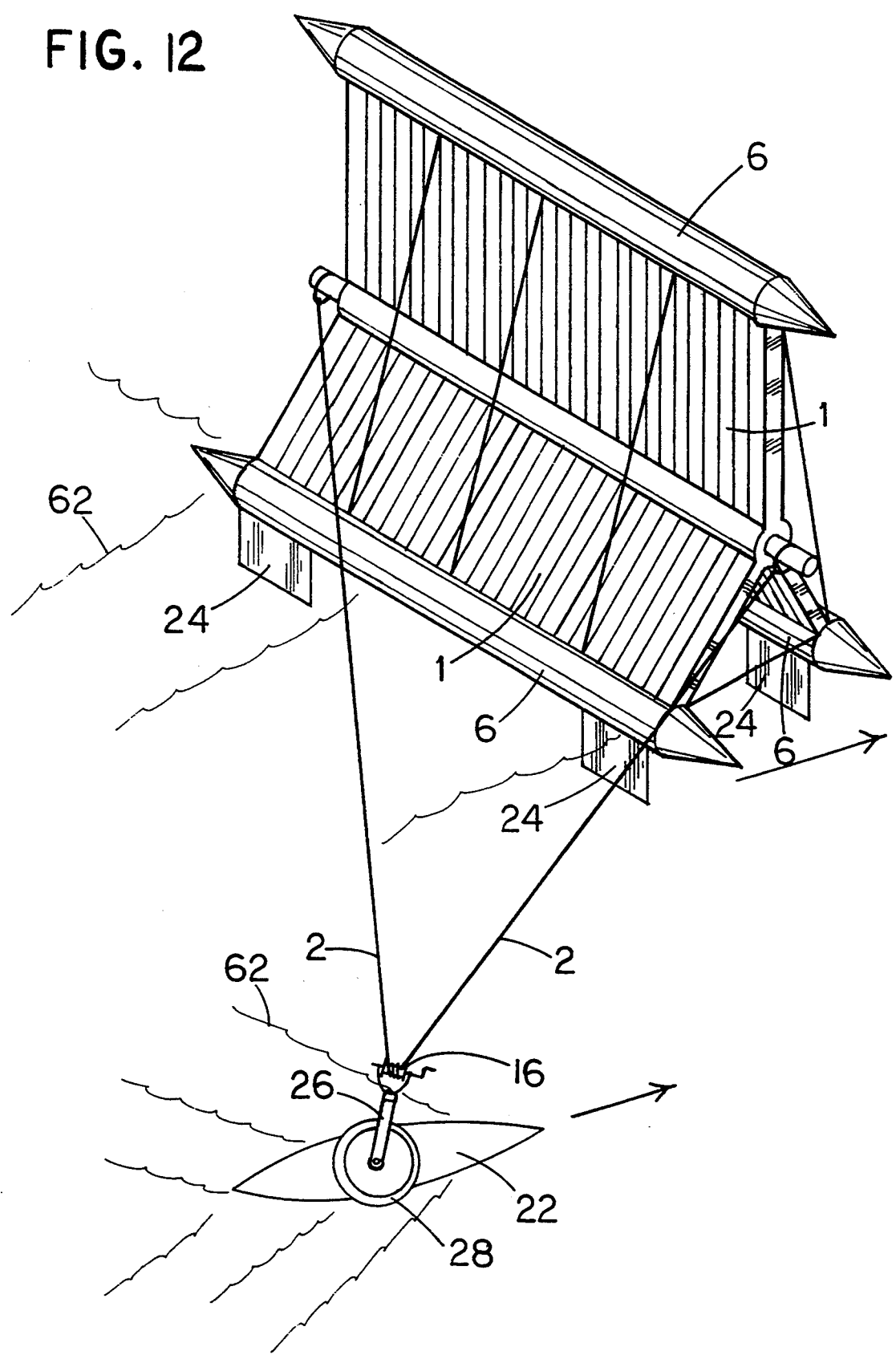
FIG. 12 illustrates how to construct a new design for an independently floating kite-sail in a 120° degrees radial formation being carried by elongated floaters.

FIG. 12—illustrates an embodiment of a new invention of a radial sail that is independently floating on water at a striding posture that functions as a non-flying kite and also acting as an independent sail boat, wherein, three pieces of wide face sails are radially assembled together such that one side of each are attached to each other at the center forming a radial figure at 120° degrees between sails so that one sail is up-right when the other two sails serve as legs standing on the water. An elongated floater cylinder 6 is attached to the outer periphery of each sail and large enough to float the whole radial sail on the water 62. A thin wall 24 is attached at the bottom of floater 6 to serve as rudder and to prevent the floating sail from drifting sideward when serving as an independent floating sail boat by itself. When the floating sail serves purely as a sail to pull another boat 22, the thin wall 24 is taken out of the water by means of any kind of appropriate mechanism, so that said floating sail will be moving sideward, rearward and foreward as it pulls the boat 22 oblique to the wind. The sling rope 2 connects the floating sail to the boat in such a fashion so that said floating sail will act as a floating kite, that moves rearward and foreward as being steered by inversely shortening and elongating the left and the right control sling rope 2 respectively, by cranking the winch 16 clockwise and counter-clockwise. The anti-overturning control bar 26 connects; the sail to the boat 22 thru the rope 2 and winch 16, said bar 26 being locked to the center of the boat 22 and free to turn around and disposed to stay horizontal by means to roller bearing that bites on the horizontal circular rail 28 on top of the boat 22.

What I claim for which protection by a Letters Patent is applied for, are as follows:

I claim:

1. A lighter than air inflatable sailing vehicle, comprising:
    a vehicle including a hull a water turbine;
    a plurality of generally flat kites assembled into a vertical array above the boat to function as a wind sail, each kite having a tail;
    each kite having an electric generator in the form of turbines having a pair of oppositely rotating propellers;
    each kite having a ballast weight which floats on the water and is connected directly to the kite tail with a string;
    each kite including passenger means to allow a passenger to ride directly beneath the kite;
    a plurality of containers inflated with light gas, via a hose from the boat to the containers, to further provide lift;
    control ropes connecting the kites together at their corners in an evenly spaced manner to allow control of the kites from the vehicle.

2. A vehicle in accordance with claim 1, further comprising, said oppositely rotating propellers are driven with a double pipe co-axial drive shaft having inner and outer pipe shafts, one propeller being attached to the inner pipe shaft and the other propeller being attached to the outer pipe shaft.

3. A vehicle in accordance with claim 1, further comprising, said kites are in the form of a rectangular wide-face framed sheets, made to be extra large size compared to the size of the vehicle,
    said kites having horizontal top and bottom edge frames, a plurality of vertical frames in even spacing interconnecting said top and bottom frames, vertical strings tautly inter-tieing said top and bottom frames in order to curve said vertical frames like a bow to make the kite vertically concave to the wind, a central axial horizontal bar frame interconnecting the midpoints of all the vertical frames in a straight line to make the kite horizontally straight and stiff against bending stress, and a sheet to cover all spaces between the frames,
    the vehicle is a boat having a main mast erected at the center to hold the kite when not being used, an auxiliary mast pivotally attached to the left center side of the boat and another auxiliary mast pivotally attached to the right center side of the boat and both auxiliary masts being disposed horizontally by ropes and pulleys to take hold of the kites when sailing windward, and having a telescopic anti-tipover/anti-overturning control connector bar attached at each top end of the boat, said connector bar being used to hold the kite and being able to be turned along the longitudinal axis of the boat when said bars are not being used,
    a kite-sling rope attached to the left section of the horizontal frames of the kite, the lower end of which being attached to the left connector bar of the boat, and,
    a kite-sling rope attached to the right section of the horizontal frames of the kite, the lower end of which being attached to the right end connector bar of the boat.

4. A vehicle in accordance with claim 1, further comprising, said kites are used to pull a person on a water-ski/snowski/surfboard, on roller shoes, or on shoes that float on water.

* * * * *